(12) United States Patent
Frimout

(10) Patent No.: US 7,017,078 B2
(45) Date of Patent: Mar. 21, 2006

(54) POWER FAILURE RECOVERY MECHANISM FOR A RECORDING AND REPRODUCING DEVICE

(75) Inventor: Emmanuel David Lucas Michael Frimout, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 733 days.

(21) Appl. No.: 10/204,023

(22) PCT Filed: Dec. 17, 2001

(86) PCT No.: PCT/IB01/02582

§ 371 (c)(1),
(2), (4) Date: Aug. 15, 2002

(87) PCT Pub. No.: WO02/50829

PCT Pub. Date: Jun. 27, 2002

(65) Prior Publication Data

US 2003/0014690 A1    Jan. 16, 2003

(30) Foreign Application Priority Data

Dec. 20, 2000    (EP) ................................. 00204691

(51) Int. Cl.
*G06F 11/00* (2006.01)
(52) U.S. Cl. .......................................... 714/20; 714/24
(58) Field of Classification Search ................. 714/20, 714/24
See application file for complete search history.

(56) References Cited

U.S. PATENT DOCUMENTS

| | | | |
|---|---|---|---|
| 5,519,680 A * | 5/1996 | Honda | 369/47.11 |
| 5,911,779 A * | 6/1999 | Stallmo et al. | 714/6 |
| 6,938,125 B1 * | 8/2005 | Yamamoto et al. | 711/114 |
| 2002/0025138 A1 * | 2/2002 | Isobe et al. | 386/95 |
| 2002/0101772 A1 * | 8/2002 | Denda et al. | 365/200 |
| 2003/0093723 A1 * | 5/2003 | Yoshida et al. | 714/42 |
| 2003/0202783 A1 * | 10/2003 | Cho | 386/125 |
| 2005/0025468 A1 * | 2/2005 | Osaki | 386/125 |
| 2005/0091280 A1 * | 4/2005 | Winter | 707/104.1 |
| 2005/0108318 A1 * | 5/2005 | Kim | 709/200 |
| 2005/0131963 A1 * | 6/2005 | Yoshida et al. | 707/202 |

OTHER PUBLICATIONS

Patent Abstracts Of Japan, Hosaka Yoshiaki, Recording And Reproducing Device, Publication No. 11167787, Jun. 22, 1999, Application No. 09334267, Apr. 12, 1997.
Patent Abstracts Of Japan, Yamazaki Yutaka, Disk Recording And Reproducing Device, Publication No. 08077749, Mar. 22, 1996, Application No. 06240611, Aug. 9, 1994.

* cited by examiner

*Primary Examiner*—Bryce P. Bonzo
(74) *Attorney, Agent, or Firm*—Michael E. Belk

(57) ABSTRACT

The present invention relates to a power failure recovery mechanism for a recording and reproducing device such as a DVD player, wherein a recording indication information and a recovery pointer information is written in a non-volatile random access memory, while a recovery information is recorded on a record carrier such as a recordable optical disc. At a power-up operation, the recording indication information is used to determine a power failure and the pointer information is used to reproduce the recovery information in case of a determined power failure. Thus, the pointer information indicates the location of incremental recovery data structures on the record carrier, such that a recovery can be achieved after a power failure without requiring a restart of the entire recording.

18 Claims, 4 Drawing Sheets

POWER FAILURE RECOVERY MECHANISM FOR A RECORDING AND REPRODUCING DEVICE

The present invention relates to a power failure recovery method and a recording and reproducing device as defined in the preambles of claims 1 and 13, respectively.

Computers and consumer electronics have been converging for years now, a tendency accelerated by the development of the optical disc which opened the way to the recent explosive growth of multimedia systems. As this convergence continues, the need is growing in the film industry for new high-capacity video discs, and in the computer industry for an equally high-capacity ROM-discs.

DVD (Digital Versatile Disc) applications have been designed to provide consumers with a high-quality multimedia format that will provide better quality and more features than conventional VHS, SVHS or Laser Disc based products. DVD-Video applications require that data stored on the disc follow a predetermined volume structure. A lead-in and lead-out area are provided at the start and the end of the disc to facilitate synchronization of the DVD players with the data stored on the disc. A Video Manager file is used to store control information and video objects for the title menu. One or more Video Title Set (VTS) files are used to provide information on each title stored on the disc, including control data, video objects for the title menu, and video objects for the title. All data for a video title must be stored in a directory located directly underneath the root directory.

During DVD recording, many recording data structures are kept in a volatile memory. These structures are necessary to be able to write a Video Title Set Information (VTSI) at the end of the recording. The VTSI describes the nature of the VTS. According to the ISO 9660 specifications, VTS may comprise a maximum of ten files. Without the VTSI, the entire recording is useless. Moreover, the menu creation makes use of these data structures.

In case of a power failure during a recording operation, the data structures stored in the volatile memory are lost. Therefore, a recovery mechanism is required.

Document JP-A-10 161 938 discloses a disc control apparatus with a recovery function, wherein a non-volatile SRAM (Static Random Access Memory) having a smaller memory capacity than a write-back cache memory is used. The optical data from a host is written into both the cache memory and the non-volatile SRAM. As the memory capacity of the non-volatile SRAM is insufficient, batch forwarding of each optical data currently written in the non-volatile SRAM is done to a predetermined disc back-up area on a disc drive. In case of a service interruption, the optical data stored in the cache memory is lost. However, the contents of the non-volatile SRAM and disc back-up area can be used to restore the lost optical data. Thereby, a battery for holding the cache memory data is not required.

Furthermore, document JP-A-10 333 996 discloses a recording and reproducing device for recording on and reproducing from a recording medium. During a write-in process, a non-volatile memory stores an ID of the corresponding recording medium, using a flag. When write-in is interrupted by a power failure, a failure generation judgement unit judges the occurrence of a write-in error by comparing the ID of the recording medium and the flag stored in the non-volatile memory.

It is an object of the present invention to provide a power failure mechanism for a recording and reproducing device, by means of which a recovery can be achieved after a power failure during recording without restarting the entire recording operation.

This object is achieved by a power failure recovery method according to claim 1 and a recording and reproducing device according to claim 13.

Accordingly, by recording the recovery information on the record carrier at a location indicated by the pointer information, the recovering information can be allocated to the actual recording information, and selectively reproduced when the recording indication information indicates a power failure. An individual recovery information required for recovering specific recording sectors can be obtained after a power failure, such that a restart of the entire recording operation is no longer required.

According to an advantageous development, an additional pointer to a logical address at a beginning of a predetermined recording information portion is written in the nonvolatile random access memory, wherein the recovery pointer is defined relative to the additional pointer. In particular, the predetermined recording information portion may be a title set.

Preferably, the recording indication information is deleted when the recording operation has been finished and a title set information and menu has been written. The recording indication information may be e.g. a recording flag.

According to another advantageous development, the recovery information may be a non-standardized private data stream. The private data stream may comprise a recovery sector for each recording cell, the recovery sector comprising all information necessary for recovering the respective cell after a power failure. In particular, the recovery sector may be multiplexed after the respective cell. Furthermore, the recovery pointer may point to the last recovery sector and each recovery sector may comprise a pointer information to the preceding recovery sector, the pointer information being used to reproduce the preceding recovery sector. Then, the first recovery sector may comprise a flag information, wherein the recording step is performed until the flag information is deleted. The recovery pointer may be updated when a recovery sector has been recorded to the record carrier. The recovery sector may contain 2048 bytes, for example.

Further advantageous modifications of the invention are defined in the dependent claims.

In the following, the invention will be described in more detail with reference to the accompanying drawings, in which.

Figure 1:
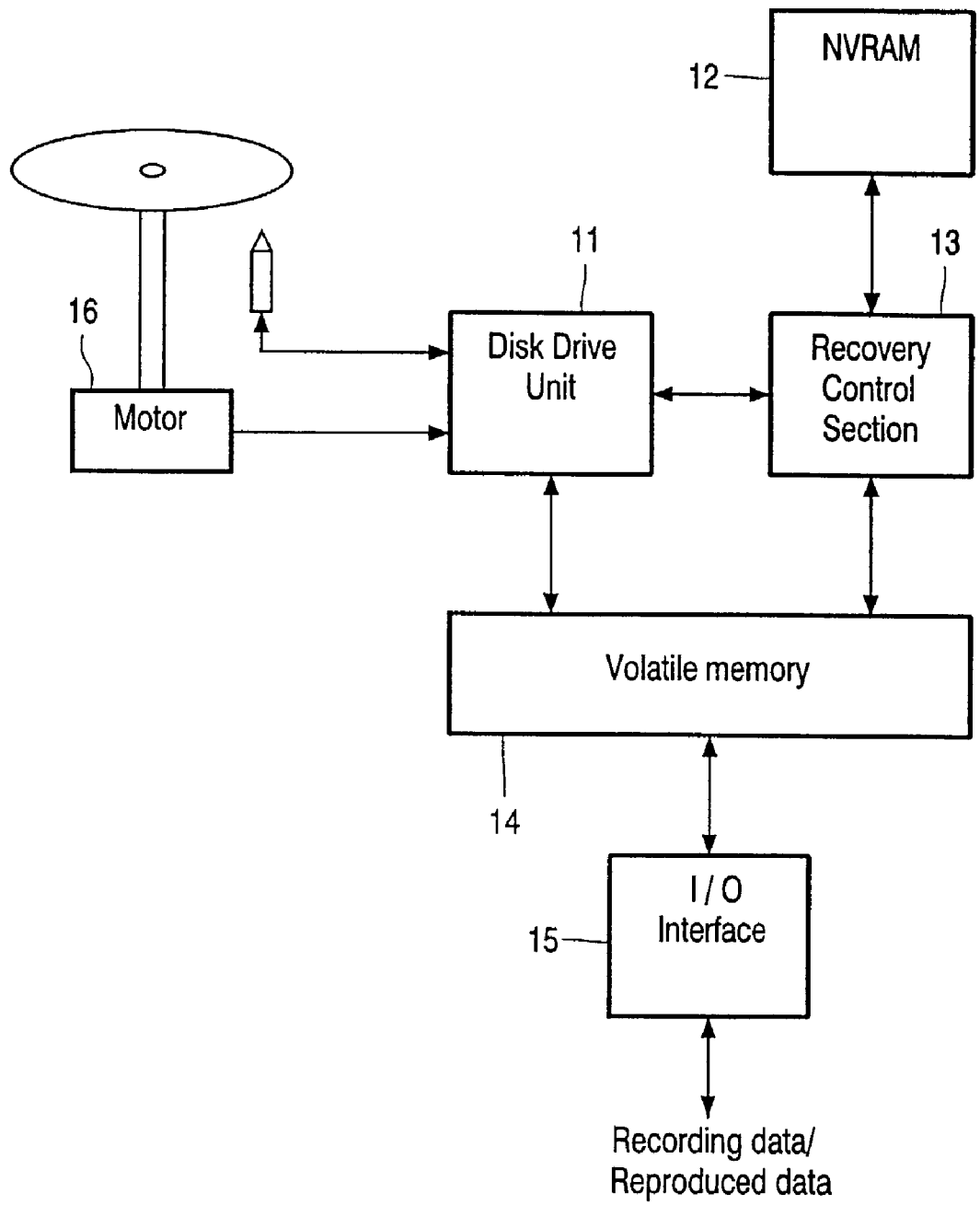
FIG. 1 shows a basic block diagram of an optical disc player according to a preferred embodiment of the present invention.

The preferred embodiment will now be described on the basis of an optical disc player, e.g. a DVD player as shown in FIG. 1.

FIG. 1 is a block diagram showing basic components of the optical disc player.

According to FIG. 1, the optical disc player comprises a disc drive unit 11 for recording on and reproducing from a recordable optical disc 20 (e.g. a DVD+R/W disc or the like)

by using a laser beam applied onto the recordable optical disc 20. Furthermore, the disc drive unit 11 is arranged to control a spindle motor 16 which rotates the recordable optical disc 20. Furthermore, a volatile memory 14 such as a static or dynamic Random Access Memory (RAM) is provided for storing data which has been reproduced from the optical disc 20 or which is to be recorded on the optical disc 20. The volatile memory 14 is connected to an I/O interface 15 for inputting and outputting recording data and reproduced data, respectively. Particularly, the I/O interface 15 may be a standard interface such as an SCSI (Small Computer System Interface). According to the preferred embodiment, a recovery control section 13 which may be arranged as a separate unit or which may be implemented in a system processor section is provided for controlling the disc drive unit 11 so as to achieve a power failure recovery mechanism. The recovery control section 13 is connected to a Non-Volatile Random Access Memory (NVRAM) 12 which may be arranged as a Static RAM (SRAM) made non-volatile by connecting it to a constant power source such as a battery, or by an EEPROM (Electrically Erasable Programmable Read-Only-Memory) or a Flash memory which save their contents when the power is turned off. The NVRAM 12 is provided for storing recovery control information required after a power failure.

Figure 2:
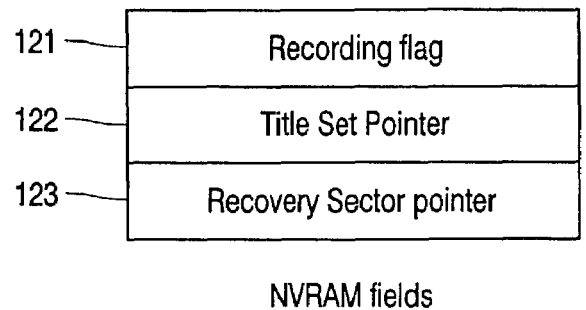
FIG. 2 shows storing fields in a non-volatile random access memory required for the recovery mechanism.

FIG. 2 shows corresponding storing fields or memory locations provided in the NVRAM 12 for storing the recovery control information. In particular, the recovery control information comprises a recording flag 121 which is set when the recording and reproducing device (i.e. DVD player) starts a recording operation. The recording flag 121 is reset or deleted when the recording has been finished and the VTSI and menu has been written. Furthermore, the NVRAM 12 comprises a field for a title sector pointer 122 which points to a logical address of an actual VTS or Audio Title Set (ATS) which is being recorded. Additionally, a storing field for a recovery sector pointer 123 is provided, the recovery sector pointer 123 being defined relative to the beginning or start address of the VTS or ATS.

The recorded area of the optical disc 20, provided between the lead-out area and the lead-in area has a volume and file structure which complies which specific logic format standards, such as micro UDF (Universal Disc Format) and ISO 9660 (International Standards Organization). The volume and file structure consists of a volume management information area and a file area which includes a volume information file, and at least one VTS and/or ATS. The volume management information stores contents which are defined in the above described standard. The file area stores video data, audio data, and data for managing the video data and the audio data. That is, the VTS stores video, audio and sub-picture data, the ATS stores audio data and the file stores management data related to the VTSs and ATSs. Each of the title sets consists of at least one file and maximum ten files. The title sets comprise video objects which consists of a number of video cells comprising a plurality of GOPs (Group of Pictures). A movie story is a sequence of chapters which correspond to programs. Thus, each program is defined as a group of video cells and each object consists of a plurality of programs.

Figure 3:
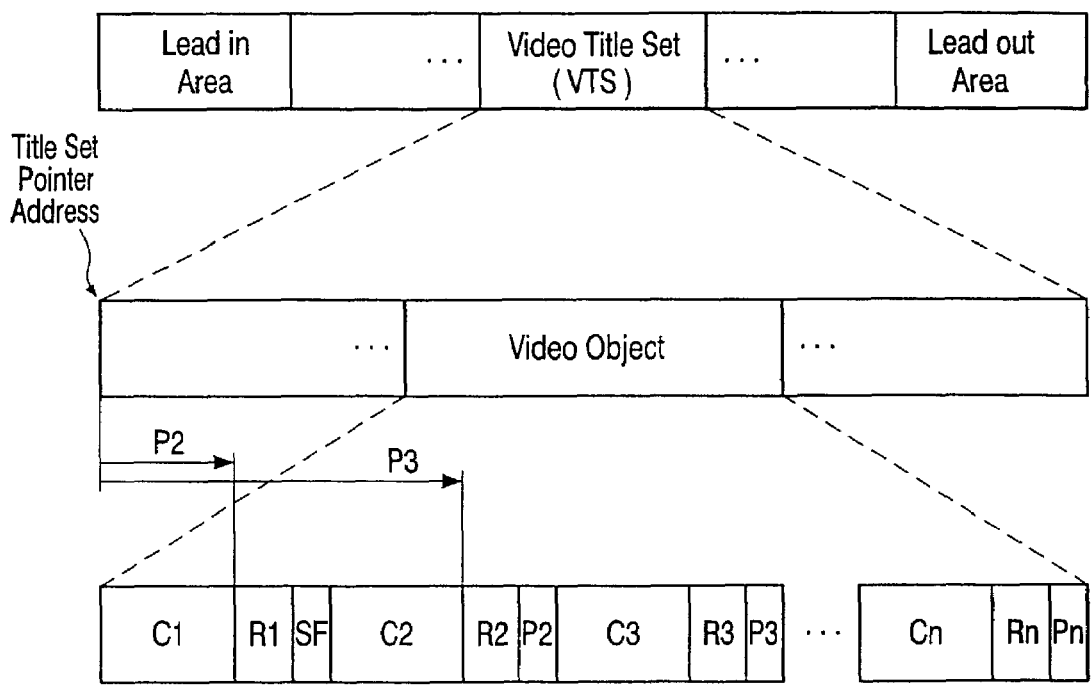
FIG. 3 shows a recorded data sequence according to the preferred embodiment of the present invention.

FIG. 3 shows a diagram representing the logic format of an optical disc and the location of the pointer information and recovery information within individual cells.

As can be gathered from FIG. 3, the logic format comprises at least one Video and/or Audio Title Set. The VTS comprise a plurality of video objects each of which comprises a plurality of video cells C1 to Cn consisting of a plurality of GOPs (Group of Pictures). The video cells C1 to Cn are multiplexed with corresponding recovery sectors R1 to Rn and corresponding pointers P2 to Pn. The first cell C1 is followed by a start flag SF and has no pointer allocated.

Figure 4:
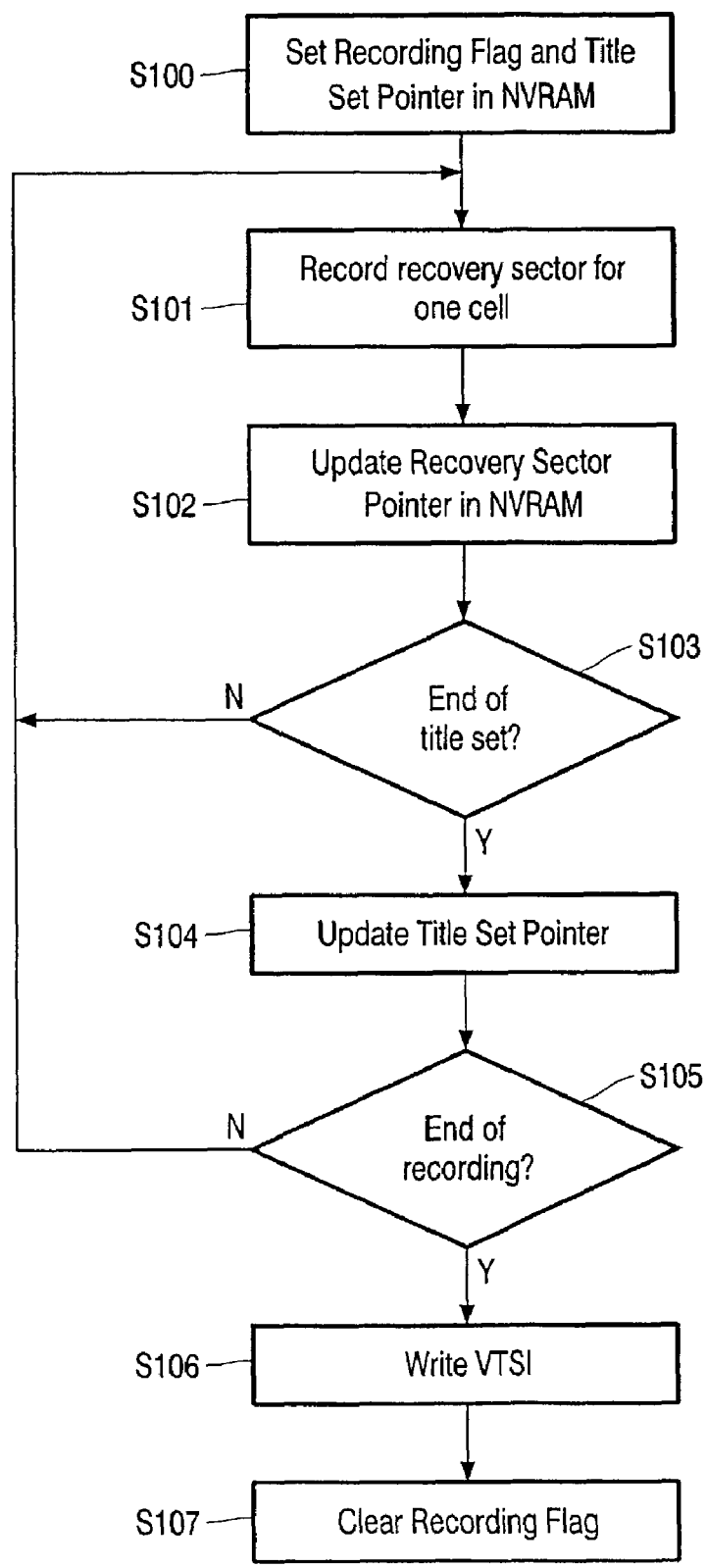
FIG. 4 shows a basic flow diagram of a recording operation according to the preferred embodiment.

In the following, a recording operation of the recording and reproducing device shown in FIG. 1 is described with reference to the flow diagram depicted in FIG. 4.

When the power is turned on and the optical disc 20 is loaded, an initialization program is started and the recording flag 121 and the Title Set Printer 122 are set in the NVRAM 12 under control of the recovery control section 13 (step S100). A control section (not shown) of the disc drive unit 11 reads the recording data from the volatile memory 14, which has been input from a host device (not shown) via the I/O interface 15. Then, required recording data structures according to the required logic format of the optical disc, as shown in FIG. 3, are generated and stored in the volatile memory 14, in order to be supplied to the disc drive unit 11 during the recording operation. Then, the recovery control section 13 generates a private data stream defined to store incremental recording data structures on the disc. The content of the private data stream does not need to be standardized, as there is no need for recovery to be supported on a different recording and reproducing device than the one on which the recording was made. In particular, one recovery sector per cell (1–2 minutes) is sufficient. Thus, for each of the cells C1 to Cn one recovery sector R1 to Rn comprising e.g. 2048 bytes is defined and contains all information necessary to recover the corresponding cell after the power failure. As indicated in FIG. 3, each of the recovery sectors is multiplexed in the recording data stream after the entire cell has been written to the stream. However, there is no particular requirement regarding the actual location of the recovery sector with respect to the corresponding cell. In practice, it should be located as close as possible to the corresponding cell within the multiplex constraints. Each of the pointers P2 to Pn is allocated to the corresponding one of the recovery sectors R1 to Rn and points to the previous or preceding recovery sector, relative to the beginning of the corresponding title set (VTS or ATS), as indicated by the arrows shown in FIG. 3. The start flag SF is allocated to the first recovery sector R1 as a flag indicating the first recovery sector.

After the recording data for one cell and the corresponding recovery sector have been recorded on the optical disc 20 in step S101, the recovery sector pointer 123 is updated in the NVRAM 12 by the recovery control section 13, so as to point to the latest recorded recovery sector (last recovery sector) (step S 102). Then, a check is performed in step S103 whether the end of a title set has been reached. If not, the flow returns to step S101 and the next cell is recorded together with the corresponding recovery sector and pointer.

If the end of a title set has been detected in step S103, the title set pointer 122 is updated in the NVRAM 12 by the recovery control section 13 (step S104). Thereafter, it is checked in step S105 whether the end of recording has been reached. If not, the flow returns to step S101 in order to record the first cell C1 of the new title set together with the sector flag SF. If, on the other hand, the end of recording has been detected, the VTSI is recorded in step S106. Then, the recording flag 121 in the NVRAM 12 is cleared or reset by the recovery control section 13 in step S107.

Thus, a recording overhead is generated by the recovery mechanism. Each of the recovery sectors C1 to Cn contains e.g. 2048 kBit per minute (assuming that one cell has a duration of one minute). Thus, 273 bits are recorded per second. Considering a typical recording rate of 3 Mbit/s, this overhead can be regarded negligible.

In the following, a recovery operation after a power failure is described with reference to FIG. 5.

Figure 5:
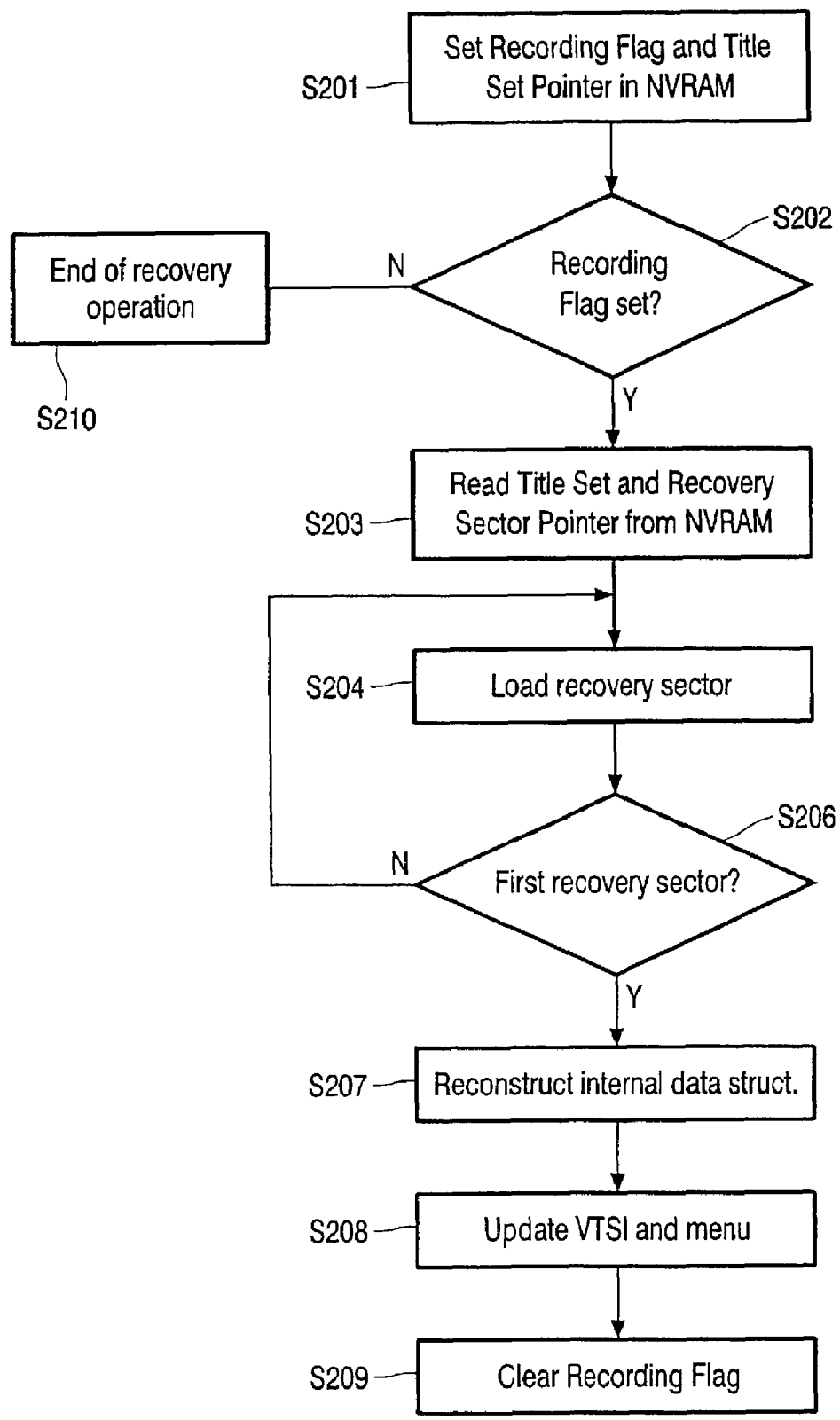
FIG. 5 shows a basic flow diagram of a recovery operation according to the preferred embodiment.

According to FIG. 5, the recovery control section 13 reads the recording flag 121 after the recordable optical disc 20 has been detected after power turn-on. Then, it is detected in step S202 whether the recording flag is still set. If not, a recovery operation is not required, since the recording of the optical disc 20 has not been interrupted by a power failure. Thus, the recovery operation is stopped in step S210.

If it is detected in step S202 that the recording flag is still set, an interruption of the recording due to a power failure is assumed and the title set pointer 122 and the recovery sector pointer 123 are read from the NVRAM 12 by the recovery control section 13. Accordingly, the position of the last recovery sector before the power failure can be derived from the pointer information stored in the NVRAM 12. Then, the recovery control section 13 controls the disc drive unit 11 so as to reproduce the respective recovery sector indicated by the pointer information and loads the recovery sector into the volatile memory 14 (step S204). Based on the loaded recovery sector, the recovery control section 13 detects the recorded pointer Pi to the preceding recovery sector R(i-1) in step S205.

Alternatively, it may be necessary to load all recovery sectors at once, depending on the internal RTA data structures.

Based on the detected pointer Pi, the previous recovery sector R(i-1) is retrieved from the reproduced information. In step S206, it is checked on the basis of the sector flag SF whether the first recovery sector has been reached. If not, the flow returns to step S204 in order to load or derive the next recovery sector.

If the first recovery sector has been detected in step S206, the internal data structures are reconstructed in step S207 based on the obtained recovery information. Then, the VTSI and menu can be updated in step S208 such that a cell accurate recovery has been performed. When the recovery has been completed, the recording flag 121 in the NVRAM 12 is cleared or reset by the recovery control section 13 in step S209.

The recovery time can be estimated as follows. Assuming a cell duration of one minute and a recovery duration of 0.5 to 1 seconds for each cell, a recording of two hours will take 60 to 120 seconds to be recovered. This duration does not include the time needed to generate the menu.

In summary, a recovery mechanism is proposed which provides a recovery from power failure. To achieve this, a recovery stream is defined for recording incremental data structures on the record carrier. Based on the recording flag 121 and the pointer information stored in the NVRAM 12, the recorded recovery data structures can be retrieved. The recording flag 121 is set at the beginning of the recording, and the pointer information is updated during the recording of the recovery information. Thus, a recovery after a power failure during recording can be achieved without requiring a restart of the entire recording.

While the invention has been described with reference to a preferred embodiment, it is to be understood, that this is not a limiting example. Thus, various modifications may become apparent to those skilled in the art without departing from the scope of the invention, as defined in the appended claims. In particular, the invention is not limited to the specific recording data structure shown in FIG. 3 and the recordable optical disc. The invention is applicable to any recordable record carrier or medium. Any kind of recording structure of the recovery information can be implemented as long as the recovery information can be retrieved on the basis of the pointer information stored in the non-volatile memory of the recording and reproducing device. In particular, the pointer information may comprise a single absolute pointer which points to the recovery information.

What is claimed is:

1. A power failure recovery method for a record carrier recording and reproducing device (10) having a non-volatile random access memory (12) characterized by the steps of:
   a) writing a recording indication information and a recovery pointer information in said non-volatile random access memory (12) during a recording operation;
   b) recording a recovery information on the record carrier (20) at a location indicated by said pointer information;
   c) deleting said recording indication information at the end of said recording operation;
   d) reproducing said recovery information from said record carrier (20) by using said recovery pointer information, if said recording indication information is detected at a power-up operation; and
   e) performing a recovery operation based on said reproduced recovery information.

2. A method according to claim 1,
   characterized by the step of
   writing a pointer to a logical address of the beginning of a predetermined recording information portion, in said non-volatile random access memory (12), wherein said recovery pointer is defined relative to said pointer.

3. A method according to claim 2,
   characterized in that
   said predetermined recording information portion is a title set.

4. A method according to claim 1,
   characterized in that
   said recording indication information (121) is deleted when said recording operation has been finished and a title set information and menu has been written.

5. A method according to claim 1,
   characterized in that
   said recording indication information is a recording flag (121).

6. A method according to claim 1,
   characterized in that
   said recovery information is a non-standardized private data stream.

7. A method according to claim 6,
   characterized in that
   said private data stream comprises a recovery sector for each cell, said recovery sector comprising all information necessary for recovering the respective cell after power failure.

8. A method according to claim 7,
   characterized in that
   said recovery sector is multiplexed after said respective cell.

9. A method according to claim 7,
   characterized in that
   said recovery pointer points to the last recovery sector and each recovery sector comprises a pointer information to the preceding recovery sector, said pointer information being used to reproduce said preceding recovery sector.

10. A method according to claim 7,
    characterized in that
    the first recovery sector comprises a flag information, wherein said recording step is performed until said flag information is detected.

11. A method according to claim 7,
characterized in that
said recovery pointer is updated when a recovery sector has been recorded to the record carrier (20).

12. A method recording to claim 7,
characterized in that
said recovery sector contains 2048 bytes.

13. A recording and reproducing device for recording on and reproducing from a record carrier (20), said device comprising:
recording and reproducing means (11) for recording on and reproducing from said record carrier (20); and
a non-volatile random access memory (12),
characterized by
writing means (13) for writing a recording indication information (121) and a pointer information into said non-volatile random access memory (12) during a recording operation; deleting means (13) for deleting said recording indication information (121) at the end of said recording operation; and
determining means (13) for determining whether said recording indication information (121) is deleted or not;
wherein said recording and reproducing means (11) is arranged to reproduce said recovery information from said record carrier (20) by using said pointer information in response to the output of said determining means (13).

14. A device according to claim 13,
said characterized in that
said record carrier is a recordable optical disc (20).

15. A device according to claim 13,
characterized in that
said recovery pointer points to a last recovery sector of said recovery information and said recording and reproducing means (11) is controlled to reproduce said recovery information by using a pointer information contained in each recovery sector and pointing to the preceding recovery sector.

16. A device according to claim 15,
characterized in that
said recording and reproducing means (11) is controlled to reproduce said recovery information until a flag information indicating the first recovery sector has been detected.

17. A device according to claim 13,
characterized in that
said recording and reproducing means (11) is arranged to multiplex said recovery information with a recording information during said recording operation.

18. A device according to claim 13,
characterized in that
said recording and reproducing device is a DVD player.

* * * * *